United States Patent
Shen

[11] Patent Number: 6,027,045
[45] Date of Patent: Feb. 22, 2000

[54] WATER SPRAYING GUN

[76] Inventor: Chung-Shan Shen, No. 34, Ho-Ping Rd. Hu-Wei Chen, Yunlin Hsien, Taiwan

[21] Appl. No.: 09/188,873

[22] Filed: Nov. 9, 1998

[51] Int. Cl.[7] .................................................... B05B 15/00
[52] U.S. Cl. ........................................... 239/525; 251/230
[58] Field of Search .................................. 239/525, 526, 239/530; 251/38, 74, 245, 2, 230

[56] References Cited

U.S. PATENT DOCUMENTS

| | | | |
|---|---|---|---|
| 387,008 | 7/1888 | Perry | 251/236 |
| 3,489,175 | 1/1970 | Loveless et al. | 251/230 X |
| 4,432,483 | 2/1984 | Kuck | 239/525 X |
| 4,986,477 | 1/1991 | Rowan | 239/525 X |
| 5,660,333 | 8/1997 | Strahman et al. | 239/526 X |

FOREIGN PATENT DOCUMENTS

| | | | |
|---|---|---|---|
| 154091 | 9/1985 | European Pat. Off. | 239/526 |
| 2318313 | 4/1973 | Germany | 239/526 |

Primary Examiner—Kevin Weldon
Attorney, Agent, or Firm—Skjerven, Morrill, MacPherson, Franklin & Friel LLP; Alan H. MacPherson

[57] ABSTRACT

A water spraying gun includes a gun housing with a hollow handle portion and a spout portion, a spring-loaded valve to control fluid flow between the handle portion and the spout portion, an operating lever coupled to the valve, and a positioning unit that includes a slide member with a vertical guiding face which is formed with a V-shaped first guiding channel, a V-shaped second guiding channel above the first guiding channel, and a V-shaped third guiding channel above the second guiding channel. Each of the guiding channels has a left section which inclines upwardly and leftward, and a right section which inclines upwardly and rightward. The guiding face is further formed with a vertical right guiding groove on a right side of the guiding channels and communicated with upper ends of the right sections of the guiding channels, and a vertical left guiding groove on a left side of the guiding channels and communicated with upper ends of the left sections of the guiding channels. A retaining rod, which extends toward the vertical guiding face, is normally retained in the first guiding channel, and is movable to one of the second and third guiding channels when the operating lever is depressed.

11 Claims, 9 Drawing Sheets

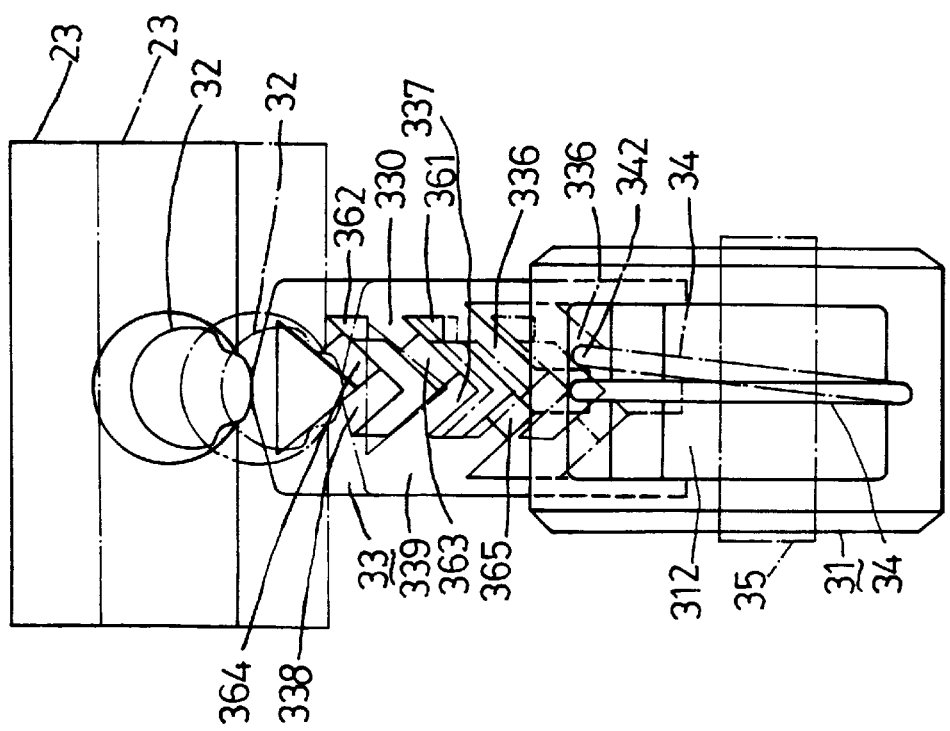
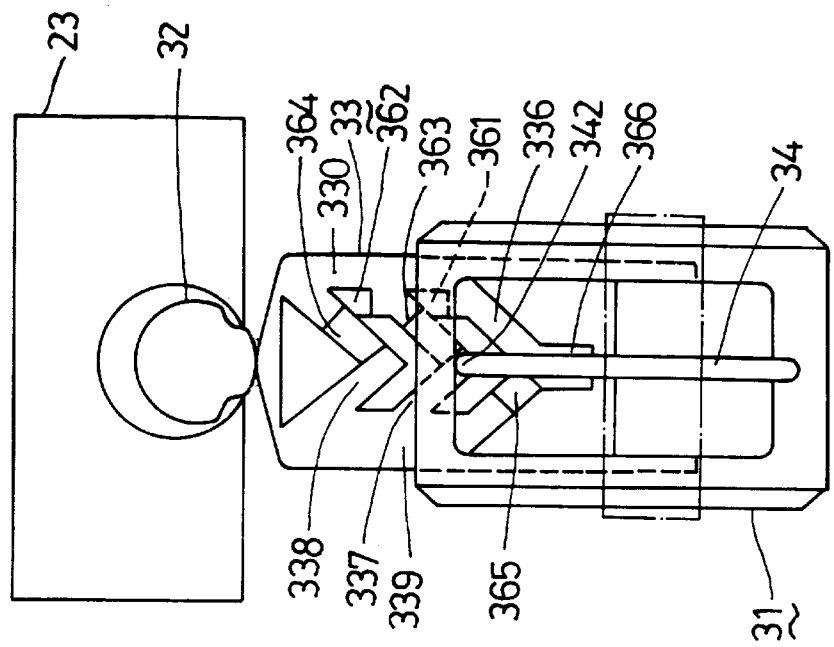

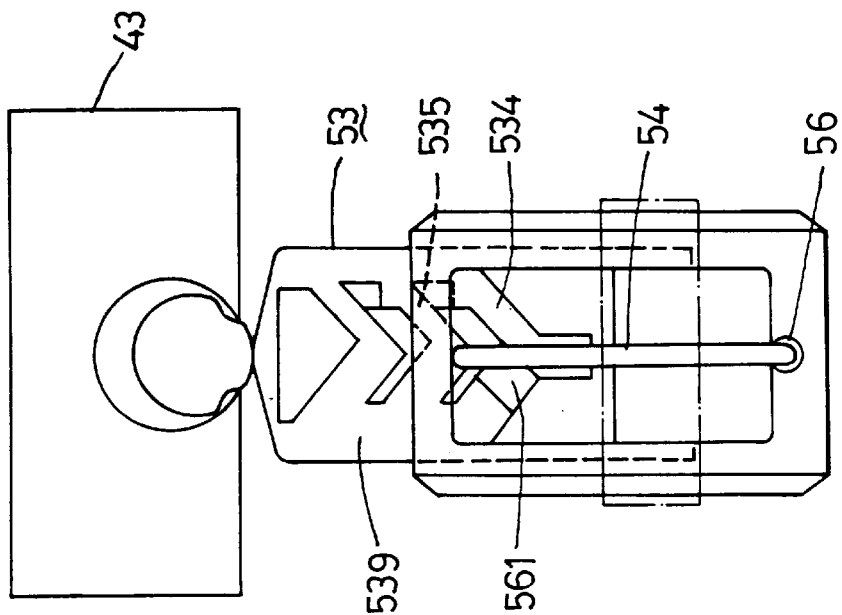
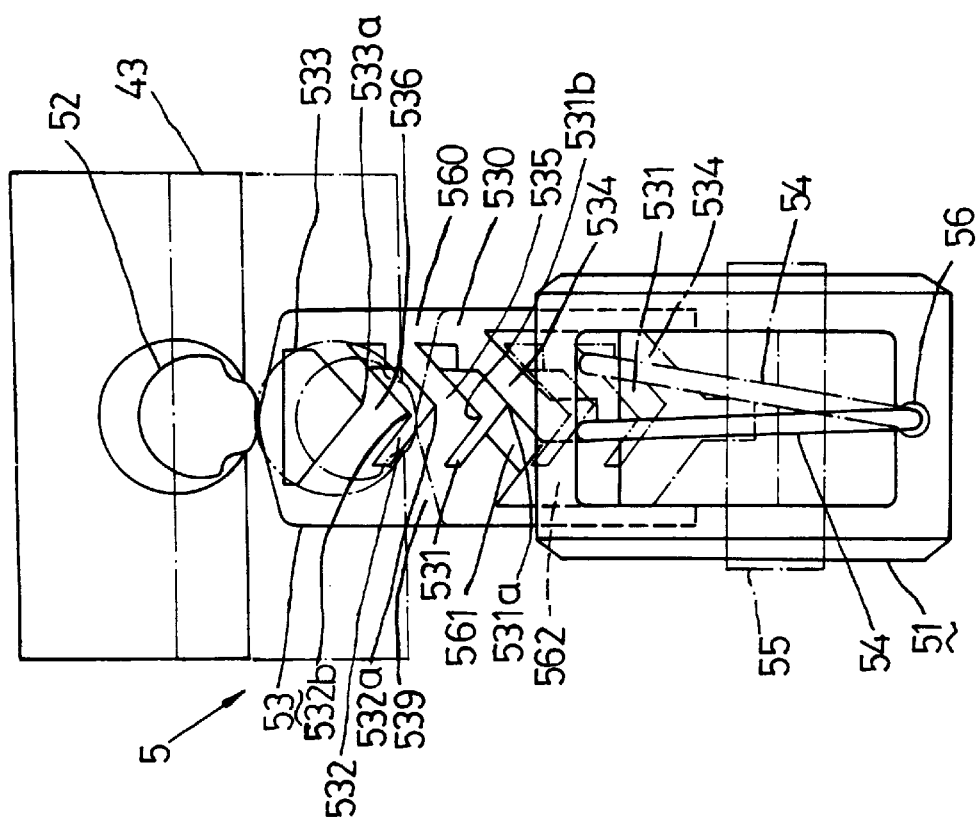

WATER SPRAYING GUN

BACKGROUND OF THE INVENTION

1. Field of the Invention

This invention relates to a water spraying gun, more particularly to a water spraying gun having an operating lever that is operable so as to regulate fluid flow through a spout portion of the water spraying gun.

2. Description of the Related Art

FIG. 1 illustrates a conventional water spraying gun 1 which includes a gun housing with a hollow handle portion 11 and a spout portion 12 formed at a front end of the handle portion 11, a valve member 14 disposed in the spout portion 12, a biasing spring 15 disposed in the spout portion 12 around the valve member 14, and an operating lever 13 that has front and rear end portions and an intermediate portion pivoted to the handle portion 11. The handle portion 11 confines an elongate first fluid passage 111. The spout portion 12 confines a second fluid passage 121. The handle portion 11 is formed with an upward flange 124 at a juncture of the handle portion 11 and the spout portion 12 to define a valve opening 123 between the handle portion 11 and the spout portion 12 for communicating the first and second fluid passages 111, 121. The valve member 14 has an upper end coupled to the front end portion of the operating lever 13, and a lower end provided with a valve ring 141. The valve member 14 is movable in the spout portion 12 between a closed position, in which the valve ring 141 is in contact with the upward flange 124 to block fluid flow from the fluid opening 123 through the second fluid passage 121, and an open position, in which the valve ring 141 is spaced from the upward flange 124 to permit fluid flow from the fluid opening 123 through the second fluid passage 121, thereby permitting the spraying of water via the spout portion 12. The operating lever 13 is operable to move the valve member 14 between the open and closed positions. A support member 16 is provided on top of the handle portion 11, and is operable to support the front end portion of the operating lever 13 at a predetermined position, as shown in FIG. 2, thereby maintaining fluid flow through the second fluid passage 121 without the need for continuously depressing the rear end portion of the operating lever 13.

However, the support member 16 can only support the operating lever 13 at a certain position. Thus, fluid flow through the second fluid passage 121 cannot be regulated. Furthermore, in use, the operator must depress the rear end portion of the operating lever 13 with one hand, and operate the support member 16 with his other hand. The conventional water spraying gun 1 is inconvenient to operate and is thus not satisfactory.

SUMMARY OF THE INVENTION

The main object of the present invention is to provide a water spraying gun which is designed to provide an adjustable multi-stage fluid flow and which is convenient to operate.

Accordingly, the water spraying gun of the present invention includes a gun housing, a valve member, an operating lever, a biasing spring and a positioning unit. The gun housing includes a hollow handle portion that confines an elongate first fluid passage with a front end and a first longitudinal axis, and a hollow spout portion that is formed on the handle portion adjacent to the front end of the first fluid passage and that confines a second fluid passage with a second longitudinal axis generally perpendicular to the first longitudinal axis. The gun housing is formed with a fluid opening to communicate the first and second fluid passages. The handle portion is formed with an inward flange at a juncture of the handle portion and the spout portion to define the fluid opening. The valve member is movably disposed in the second fluid passage of the spout portion, and is provided with a valve ring. The valve member is movable between a closed position, in which the valve ring is seated on the flange to block fluid flow from the fluid opening to the second fluid passage, and an open position, in which the valve ring is spaced from the flange to permit fluid flow from the fluid opening to the second fluid passage. The operating lever is disposed on top of the handle portion, and has a front end portion coupled to the valve member, a rear end portion, and an intermediate portion between the front and rear end portions. The intermediate portion is mounted pivotally to the handle portion. The operating lever is operable at the rear end portion to move the valve member between the closed position and the open position. The biasing spring is disposed in the spout portion of the gun housing, and normally biases the valve member to the closed position. The positioning unit includes a hollow seat, a retaining rod, a downwardly opened elongated groove and a slide member. The hollow seat is secured on top of the handle portion, and is disposed between the handle portion and the rear end portion of the operating lever. The hollow seat is formed with a vertical slide channel which is generally transverse to the first longitudinal axis, and has a top side formed with a top opening for access into the slide channel. The retaining rod has a lower end pivoted to the seat below the slide channel, and an upper end. The downwardly opened elongated groove is formed in the rear end portion of the operating lever, and extends in a direction parallel to the first longitudinal axis. The slide member has an upper end formed with a protrusion that engages slidably the elongated groove. The slide member extends slidably into the slide channel in the seat via the top opening, and is moved in the slide channel when the operating lever is depressed. The slide member has a vertical guiding face which is formed with a V-shaped first guiding channel, a V-shaped second guiding channel above the first guiding channel, and a V-shaped third guiding channel above the second guiding channel. Each of the first, second and third guiding channels has a left section which inclines upwardly and leftward and which has an upper end, and a right section which inclines upwardly and rightward and which has an upper end. The guiding face is further formed with a vertical right guiding groove on a right side of the first, second and third guiding channels and communicated with the upper ends of the right sections of the first, second and third guiding channels, and a vertical left guiding groove on a left side of the first, second and third guiding channels and communicated with the upper ends of the left sections of the first, second and third guiding channels. The upper end of the retaining rod extends toward the vertical guiding face, and is normally retained in the first guiding channel when the valve member is in the closed position. Operation of the operating lever while the upper end of the retaining rod is in the first guiding channel causes the upper end of the retaining rod to move into the right guiding groove so as to extend into a selected one of the second and third guiding channels, thereby permitting retention of the valve member at the open position with a predetermined fluid flow through the second fluid passage. Operation of the operating lever while the upper end of the retaining rod is in one of the second and third guiding channels causes the upper end of the retaining rod to move back to the first guiding channel via the left guiding groove.

BRIEF DESCRIPTION OF THE DRAWINGS

Other features and advantages of the present invention will become apparent in the following detailed description of the preferred embodiments with reference to the accompanying drawings, in which:

FIGS. 5 to 7 are schematic views illustrating the positioning unit of the water spraying gun of the first preferred embodiment when the latter is in a state of use;

FIGS. 9 to 12 are schematic views illustrating the positioning unit of the water spraying gun of the second preferred embodiment when the latter is in a state of use.

DETAILED DESCRIPTION OF THE PREFERRED EMBODIMENTS

Figure 1:
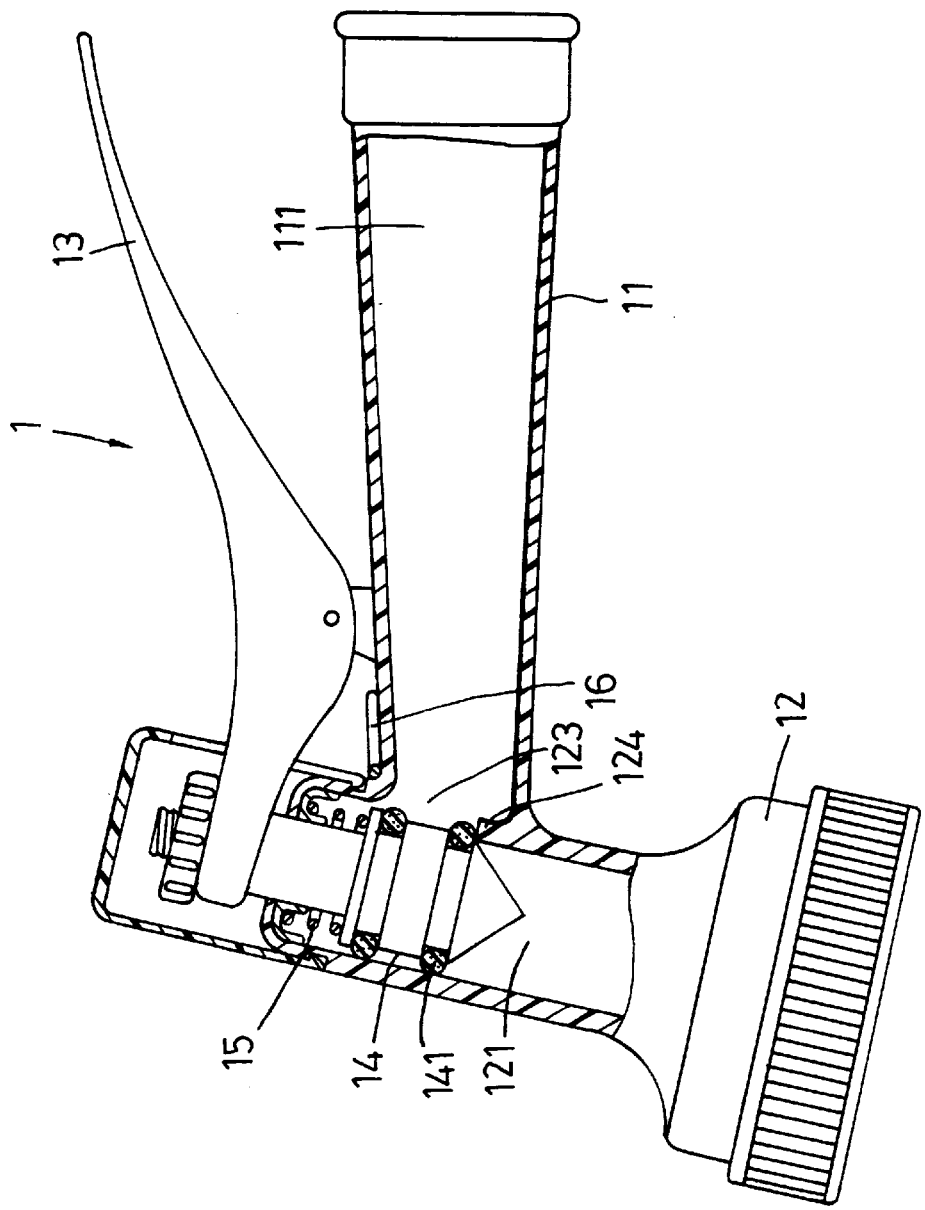
FIG. 1 is a partly sectional view of a conventional water spraying gun.
Figure 2:
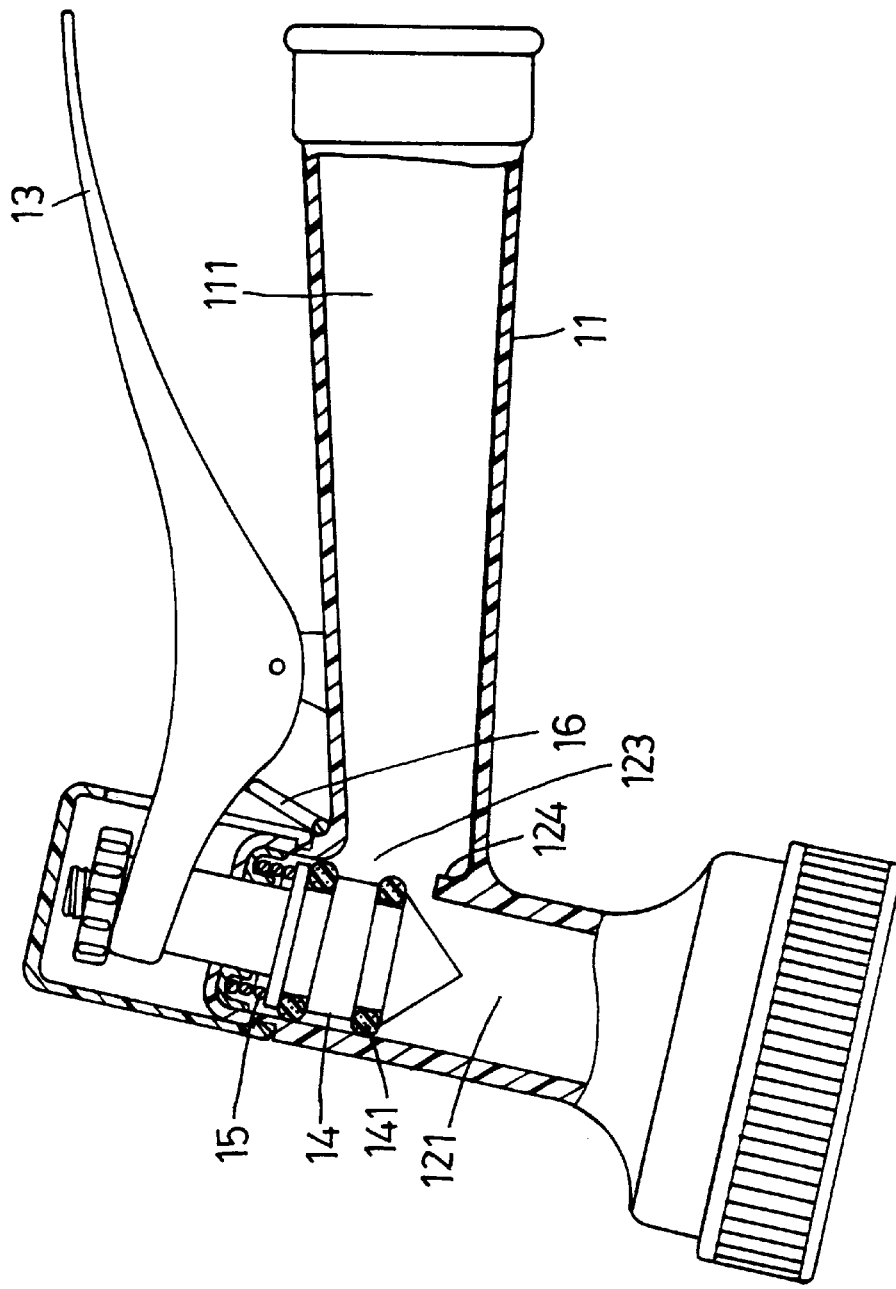
FIG. 2 is a partly sectional view of the conventional water spraying gun in a state of use.
Figure 3:
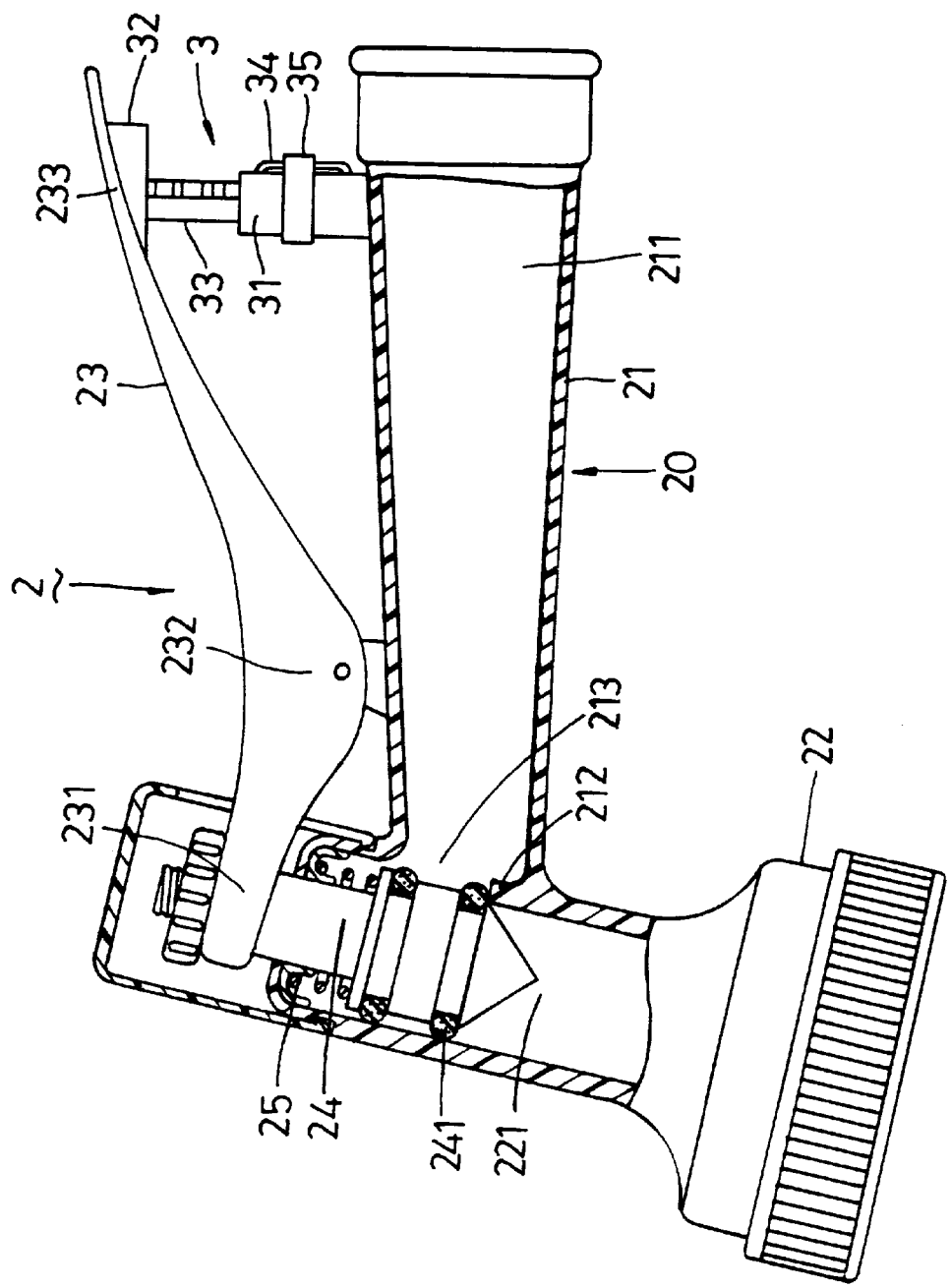
FIG. 3 is a partly sectional view of a first preferred embodiment of a water spraying gun according to the present invention.

Referring to FIG. 3, the first preferred embodiment of the water spraying gun 2 of the present invention is shown to include a gun housing 20, a valve member 24, an operating lever 23, a biasing spring 25, and a positioning unit 3.

The gun housing 20 includes a hollow handle portion 21 that confines an elongate first fluid passage 211 with a front end and a first longitudinal axis, and a hollow spout portion 22 that is formed on the handle portion 21 adjacent to the front end of the first fluid passage 211 and that confines a second fluid passage 221 with a second longitudinal axis generally perpendicular to the first longitudinal axis. The gun housing 20 is formed with a fluid opening 213 to communicate the first and second fluid passages 211, 221. The handle portion 21 is formed with an inward flange 212 at a juncture of the handle portion 21 and the spout portion 22 to define the fluid opening 213.

The valve member 24 is movably disposed in the second fluid passage 221 of the spout portion 22, and is provided with a valve ring 241. The valve member 24 is movable between a closed position, in which the valve ring 241 is seated on the inward flange 212 to block fluid flow from the fluid opening 213 to the second fluid passage 221, and an open position, in which the valve ring 241 is spaced from the inward flange 212 to permit fluid flow from the fluid opening 213 to the second fluid passage 221.

The biasing spring 25 is disposed in the spout portion 22 of the gun housing 20 around the valve member 24, and normally biases the valve member 24 downwardly to the closed position.

The operating lever 23 is disposed on top of the handle portion 21, and has a front end portion 231 coupled to the valve member 24, a rear end portion 233, and an intermediate portion 232 between the front end rear end portions 231, 233. The intermediate portion 232 is mounted pivotally to the handle portion 21. The operating lever 23 is operable at the rear end portion 233 to move the valve member 24 between the closed and open positions.

Figure 4:
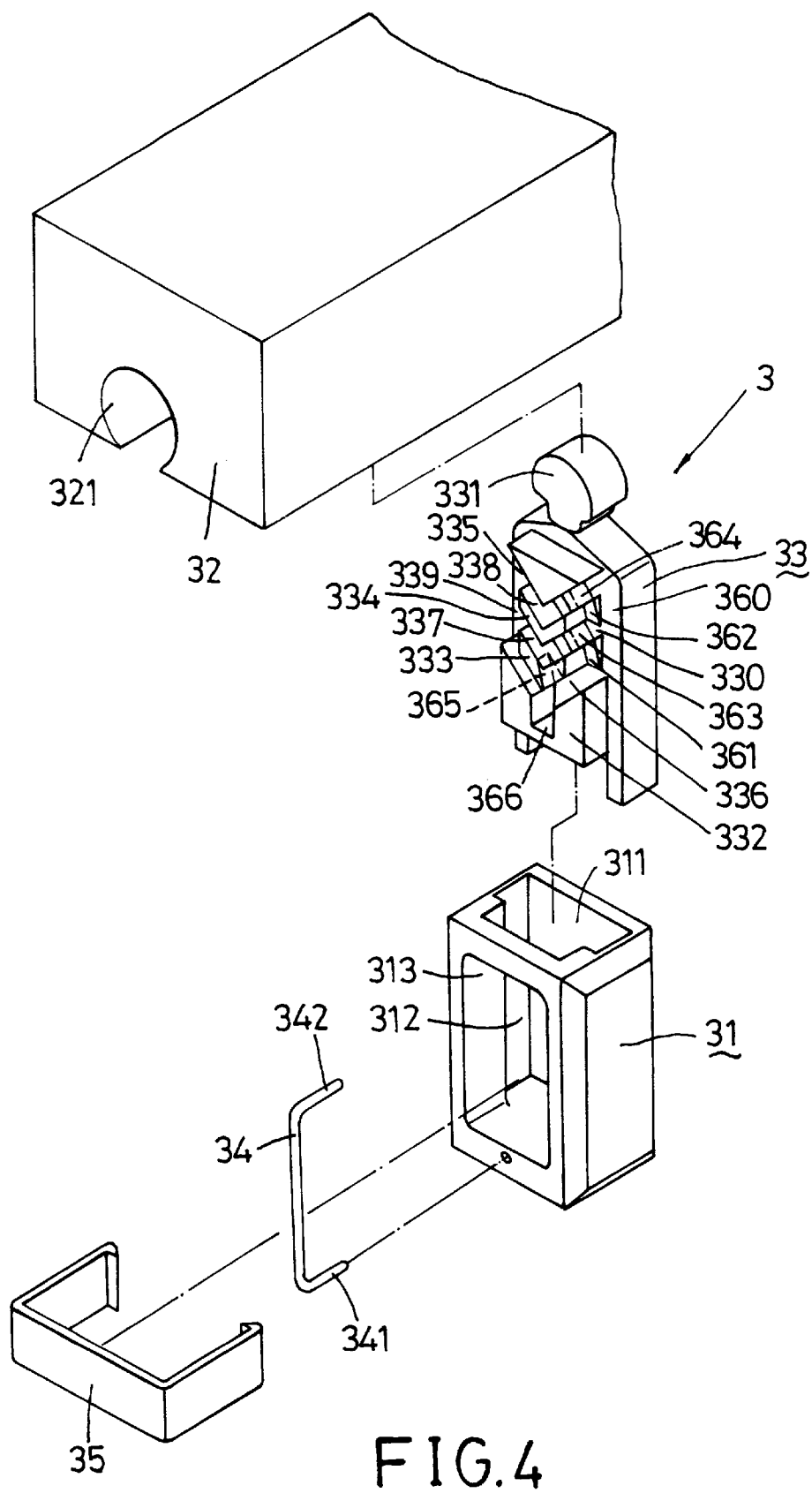
FIG. 4 is an exploded perspective view illustrating a positioning unit of the water spraying gun of the first preferred embodiment.

Referring to FIGS. 3 and 4, the positioning unit 3 includes a hollow seat 31, a retaining rod 34, a resilient fastening member 35, a slide rail 32, and a slide member 33. The hollow seat 31 is secured on top of the handle portion 21, and is disposed between the handle portion 21 and the rear end portion 233 of the operating lever 23. The hollow seat 31 is formed with a vertical slide channel 312 which is generally transverse to the first longitudinal axis of the first fluid passage 211, and has a top side formed with a top opening 311 for access into the slide channel 312. The hollow seat 31 further has a rear side formed with a rear opening 313 that is communicated with the slide channel 312.

The retaining rod 34 is generally U-shaped, and is disposed on the rear side of the hollow seat 31. The retaining rod 34 has a lower end 341 pivoted to a bottom wall of the hollow seat 31 below the slide channel 312, and an upper end 342 extending into the slide channel 312 via the rear opening 313 in the hollow seat 31. The fastening member 35 engages the hollow seat 31 to prevent removal of the retaining rod 34 from the hollow seat 31.

The slide rail 32 is secured to the rear end portion 233 of the operating lever 23 on a bottom side of the latter, and confines a downwardly opened elongated groove 321 that extends in a direction parallel to the first longitudinal axis of the first fluid passage 211.

The slide member 33 has an upper end formed with a protrusion 331 that engages slidably the elongated groove 321. The slide member 33 extends slidably into the slide channel 312 in the hollow seat 31 via the top opening 311, and is moved in the slide channel 312 when the rear end portion 233 of the operating lever 23 is depressed. The slide member 33 has a vertical guiding face 360 facing the rear opening 313 of the hollow seat 31. The vertical guiding face 360 is formed with a V-shaped first guiding channel 336, a V-shaped second guiding channel 337 above the first guiding channel 336, and a V-shaped third guiding channel 338 above the second guiding channel 337. Each of the first, second and third guiding channels 336, 337, 338 includes a left section which inclines upwardly and leftward and which has an upper end, and a right section which inclines upwardly and rightward and which has an upper end. The guiding face 360 is further formed with a vertical right guiding groove 330 on a right side of the first, second and third guiding channels 336, 337, 338, and a vertical left guiding groove 339 on a left side of the first, second and third guiding channels 336, 337, 338. The right guiding groove 330 is communicated with the upper ends of the right sections of the first, second and third guiding channels 336, 337, 338, while the left guiding groove 339 is communicated with the upper ends of the left sections of the first, second, and third guiding channels 336, 337, 338. As shown, the guiding channels 336, 337, 338 and the guiding grooves 330, 339 are defined by a plurality of guiding blocks, which include a bottom guiding block 332, a V-shaped first guiding block 333 above the bottom guiding block 332, a V-shaped second guiding block 334 above the first guiding block 333, and a triangular third guiding block 335 above the second guiding block 334. The upper end 342 of the retaining rod 34 extends toward the guiding face 360, and is normally retained in the first guiding channel 336 when the valve member 24 is in the closed position. The guiding face 360 is formed with a first check member 365 in the left section of the first guiding channel 336 adjacent to a juncture of the left and right sections of the first guiding channel 336, a second check member 361 in the right guiding groove 330 between the upper ends of the right sections of the first and second guiding channels 336, 337 and adjacent to a right end of the first guiding block 333, a third check member 362 in the right guiding groove 330 between the upper ends of the right sections of the second and third guiding channels 337, 338 and adjacent to a right end of the second guiding block 334, a fourth check member 363 in the right section of the second guiding channel 337, and a fifth check member 364 in the right section of the third guiding channel 338. The first guiding channel 336 has a receiving channel portion 366 that extends downwardly at the juncture of its left and right sections for receiving the upper end 342 of the retaining rod 34 when the latter is in the first guiding channel 336. Each of the check members 365, 361, 362, 363, 364 has a perpendicular wall generally perpendicular to the guiding face 360 to prevent movement of the upper end 342 of the retaining rod 34 in a certain direction, and an inclined wall to permit movement of the upper end 342 of the retaining rod 34 in an opposite direction past the check member 365, 361, 362, 363, 364. The first check member 365 prevents movement of the upper end 342 of the retaining rod 34 into the left guiding groove 339 via the left section of the first guiding channel 336 when the upper end 342 of the retaining rod 34 is in the first guiding channel 336. The second and third check members 361, 362 permit only upward movement of the upper end 342 of the retaining rod 34 in the right guiding groove 330. The fourth check member 363 prevents movement of the upper end 342 of the retaining rod 34 into the right guiding groove 330 when the upper end 342 of the retaining rod 34 is in the second guiding channel 337. Likewise, the fifth check member 364 prevents movement of the upper end 342 of the retaining rod 34 into the right guiding groove 330 when the upper end 342 of the retaining rod 34 is in the third guiding channel 338.

Referring to FIGS. 3 and 5, in use, before the operating lever 23 is depressed, the valve member 24 is biased to the closed position by means of the biasing spring 25, and the upper end of the retaining rod 34 is retained in the first guiding channel 336. When the operating lever 23 is depressed at the rear end portion 233 thereof, the upper end 342 of the retaining rod 34 is moved to the right guiding groove 330 past the second check member 361 since the first check member 365 prevents leftward movement of the upper end 342 of the retaining rod 34 to the left guiding groove 339. When the operating lever 23 is released at this time, the upper end 342 of the retaining rod 34 can be prevented from moving downward in the right guiding groove 330 by the second check member 361. Since the valve member 24 is always biased by the biasing spring 25 toward the closed position, thereby resulting in an upward pulling force on the slide member 33, the upper end 342 of the retaining rod 34 can extend into the second guiding channel 337 and move past the fourth check member 363, as shown in FIG. 6. The valve member 24 is thus retained in the open position with a desired fluid flow, i.e., a first stage fluid flow, through the second fluid passage 221.

Referring to FIGS. 3 and 6, when the operating lever 23 is depressed while the upper end 342 of the retaining rod 34 is in the second guiding channel 337, the upper end 342 of the retaining rod 34 moves to the left guiding groove 339 via the left section of the second guiding channel 337 since the upper end 342 of the retaining rod 34 is prevented from moving rightward to the right guiding groove 330 by the fourth check member 363. Releasing the operating lever 23 at this time causes the upper end 342 of the retaining rod 34 to move back to the first guiding channel 336 past the first check member 365 so as to be received in the receiving channel portion 366, as shown by the solid lines in FIG. 5.

Under this condition, the valve member 24 is moved to the closed position to block fluid flow from the fluid opening 213 to the second fluid passage 221.

Figure 7:
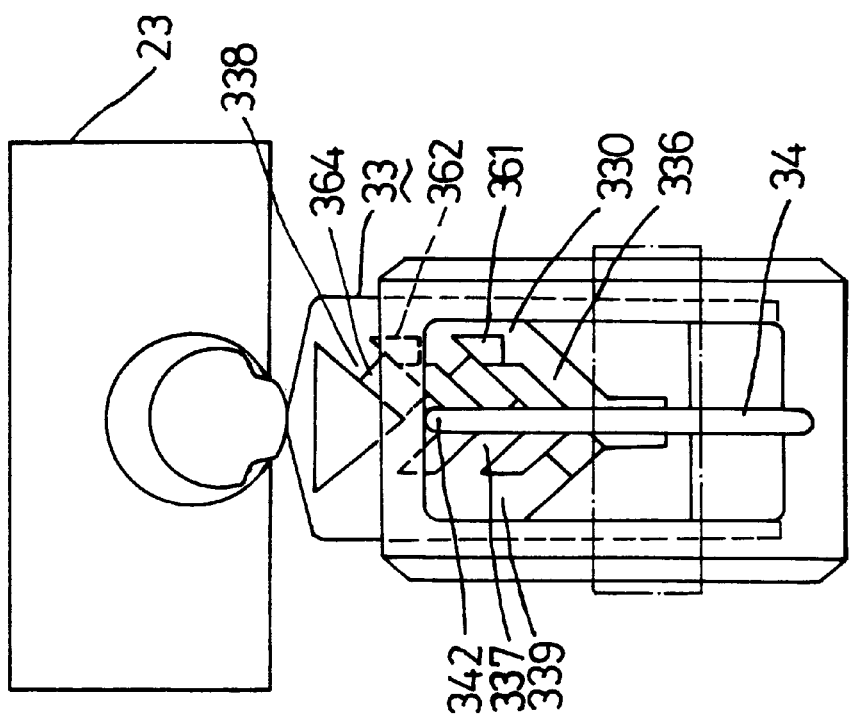

Referring to FIGS. 3 and 7, when it is desired to effect an increased fluid flow through the second fluid passage 221, the operating lever 23 is depressed again at the rear end portion 233 thereof so that the upper end 342 of the retaining rod 34 moves to the right guiding groove 330 via the right section of the first guiding groove 336 past the second and third check members 361, 362. When the operating lever 23 is released at this time, the upper end 342 of the retaining rod 34 can be prevented from moving downward in the right guiding groove 330 by the third check member 362. Likewise, since the slide member 33 is always pulled upwardly due to the action of the biasing spring 25, the upper end 342 of the retaining rod 34 can extend into the third guiding channel 338 and move past the fifth check member 364, as shown in FIG. 7. The valve member 24 is thus retained in the open position with another desired fluid flow, i.e., a second stage fluid flow, through the second fluid passage 221.

Figure 8:
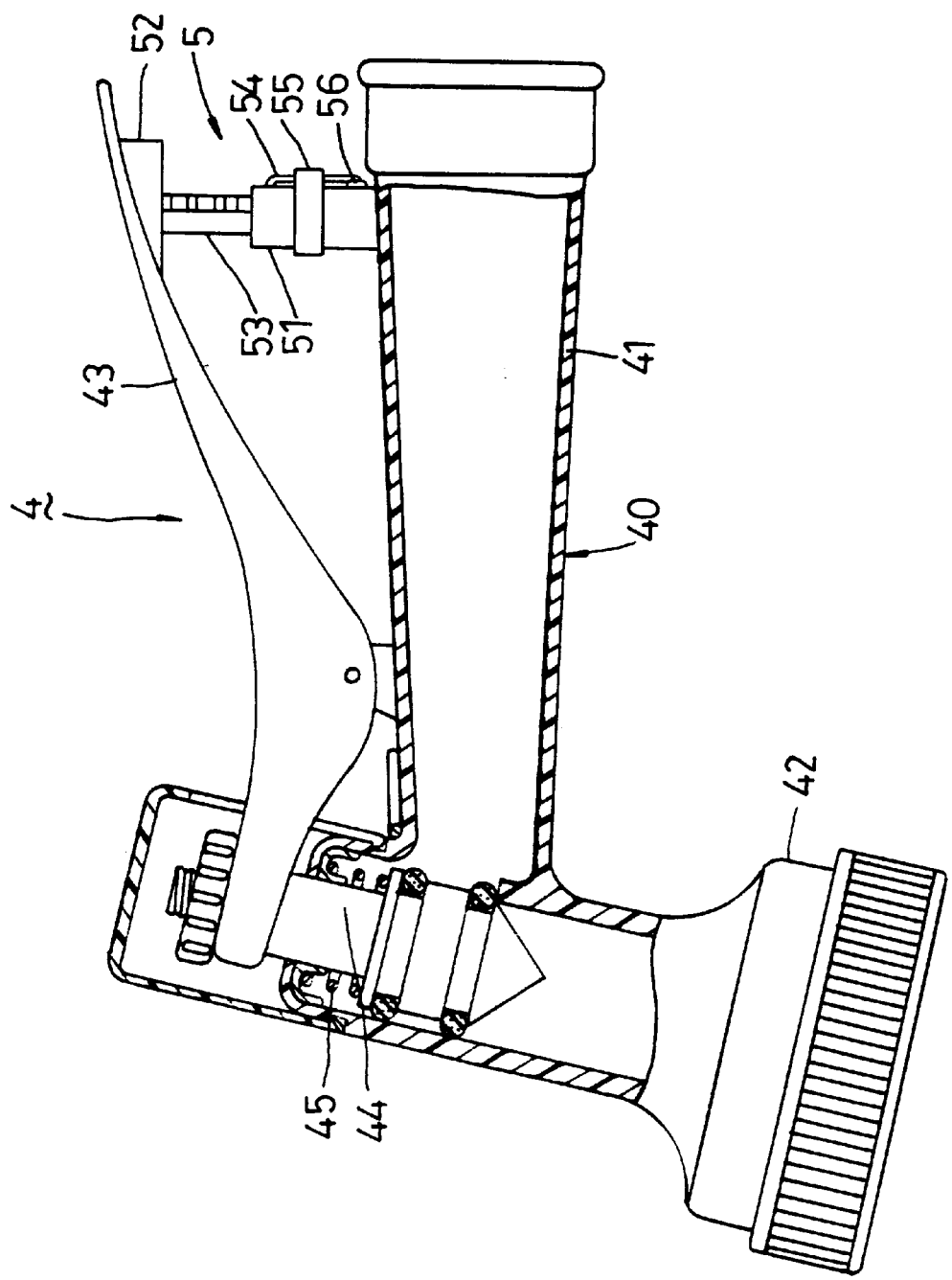
FIG. 8 is a partly sectional view of a second preferred embodiment of the water spraying gun according to the present invention.

Referring to FIGS. 8 and 9, the second preferred embodiment of the water spraying gun 4 according to the present invention is shown to include a gun housing 40 with a handle portion 41 and a spout portion 42, an operating lever 43, a valve member 44, a biasing spring 45 and a positioning unit 5. The positioning unit 5 includes a slide rail 52, a hollow seat 51, a retaining rod 54, a resilient fastening member 55 and a slide member 53. The gun housing 40, the operating lever 43, the valve member 44, the biasing spring 45, the slide rail 52, the hollow seat 51, and the resilient fastening member 55 are similar to those in the previous embodiment and will not be detailed further.

The retaining rod 54 differs from the retaining rod 34 in the previous embodiment in that a biasing member, such as a torsion spring 56, is provided at a lower end of the retaining rod 54 for biasing the upper end of the retaining rod 54 leftward.

The slide member 53 has an upper end engaging slidably the slide rail 52 in a manner similar to that in the previous embodiment. The slide member 53 extends slidably into a slide channel of the hollow seat 51 via a top opening in the latter, and is moved in the slide channel when the rear end portion of the operating lever 43 is depressed. The slide member 53 has a vertical guiding face 560 facing a rear opening in the hollow seat 51. The vertical guiding face 560 is formed with a V-shaped first guiding channel 534, a V-shaped second guiding channel 535 above the first guiding channel 534, and a V-shaped third guiding channel 536 above the second guiding channel 535. Each of the first, second and third guiding channels 534, 535, 536 includes a left section which inclines upwardly and leftward and which has an upper end, and a right section which inclines upwardly and rightward and which has an upper end. The guiding face 560 is further formed with a vertical right guiding groove 530 on a right side of the first, second and third guiding channels 534, 535, 536, and a vertical left guiding groove 539 on a left side of the first, second and third guiding channels 534, 535, 536. The right guiding groove 530 is communicated with the upper ends of the right sections of the first, second and third guiding channels 534, 535, 536, whereas the left guiding groove 539 is communicated with the upper ends of the left sections of the first, second, and third guiding channels 534, 535, 536. The retaining rod 54 has an upper end which extends toward the guiding face 560 of the slide member 53 and which is normally retained in the first guiding channel 534. A check member 561 is formed in the left section of the first guiding channel 534 to prevent movement of the upper end of the retaining rod 54 to the left guiding groove 539 via the left section of the first guiding channel 534. The guiding channels 534, 535, 536 and the guiding grooves 530, 539 are defined by a plurality of guiding blocks formed on the guiding face 560. The first guiding channel 534 is defined by a bottom guiding block 562 and a V-shaped first guiding block 531 above the bottom guiding block 562. The second guiding channel 535 is defined by the first guiding block 531 and a V-shaped second guiding block 532 above the first guiding block 531. The third guiding channel 536 is defined by the second guiding block 532 and a triangular third guiding block 533 above the second guiding block 532. As shown, the V-shaped first guiding block 531 has a lower surface formed with a tip 531a, and an upper surface formed with a corner 531b. The second guiding block 532 has a lower surface formed with a tip 532a, and an upper surface formed with a corner 532b. The triangular third guiding block 533 has a lower surface formed with a tip 533a. The tip 532a of the second guiding block 532 is staggered with the corner 531b of the first guiding block 531, and is located rightward relative to the corner 531b. The tip 533a of the third guiding block 533 is staggered with the corner 532b of the second guiding block 532, and is located rightward relative to the corner 532b.

In use, the upper end of the retaining rod 54 is normally retained in the first guiding channel 534. When the operating lever 43 is depressed, the upper end of the retaining rod 54 is moved to the right guiding groove 530 via the right section of the first guiding channel 534 since the left section of the first guiding channel 534 is blocked by the check member 561 to prevent leftward movement of the upper end of the retaining rod 54 to the left guiding groove 539. After the upper end of the retaining rod 54 is moved upwardly along the right guiding groove 530 to the upper end of the right section of the second guiding channel 535, the operating lever 43 is released. At this time, due to the biasing force exerted by the biasing spring 45, the slide member 53 is pulled upwardly, and due to the biasing force exerted by the torsion spring 56, the upper end of the retaining rod 54 is biased leftward away from the right guiding groove 530. The upper end of the retaining rod 54 can extend into the second guiding channel 535, as shown in FIG. 10, for retaining the valve member 44 at an open position with a desired fluid flow, i.e., the first stage fluid flow, through the spout portion 42.

When the operating lever 43 is depressed while the upper end of the retaining rod 54 is in the second guiding channel 535, the upper end of the retaining rod 54 moves to the left guiding groove 539 via the left section of the second guiding channel 535. Releasing the operating lever 43 at this time causes the upper end of the retaining rod 54 to move back to the first guiding channel 534 past the check member 561 so as to be retained in the first guiding channel 534, as shown in FIG. 9. Under this condition, the valve member 44 is moved to the closed position to block fluid flow from the handle portion 41 to the spout portion 42.

Figure 12:
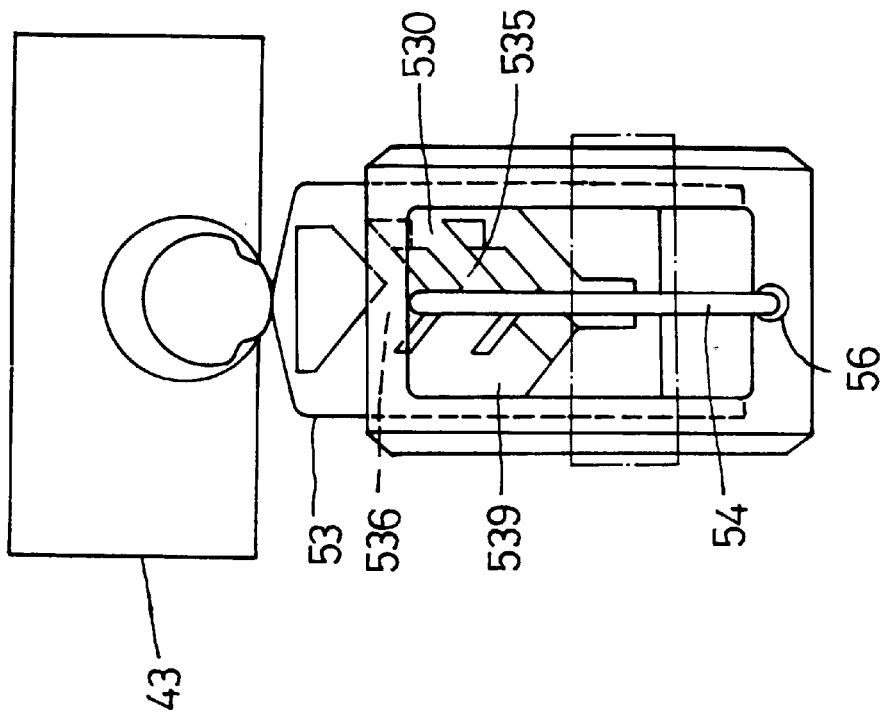
Figure 11:
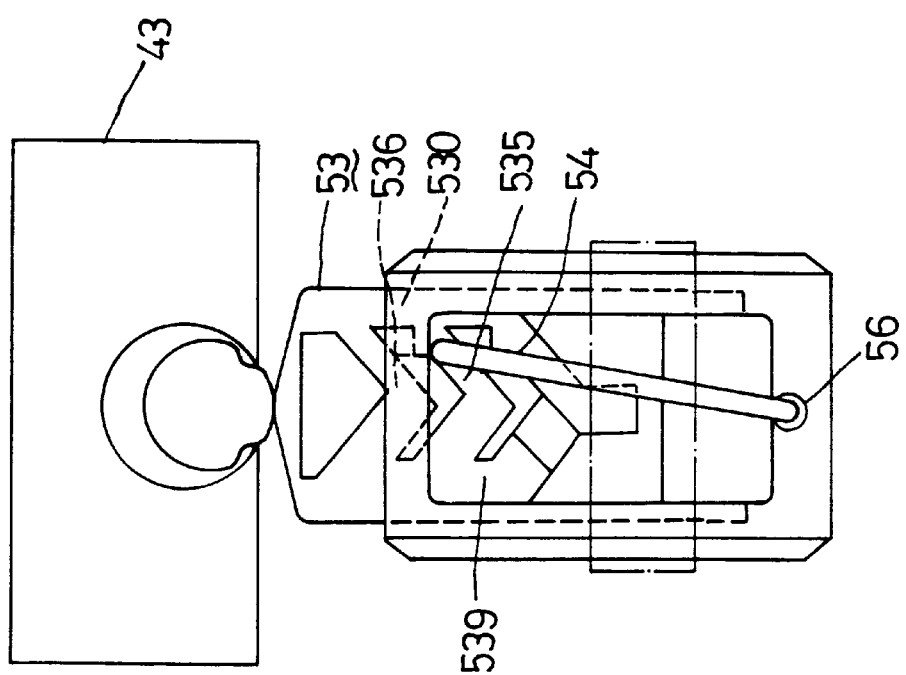

Referring to FIGS. 9 and 11, when it is desired to effect an increased fluid flow through the spout portion 42, the operating lever 43 is depressed again at the rear end portion thereof so that the upper end of the retaining rod 54 moves to the right guiding groove 530 via the right section of the first guiding groove 534 and to the upper end of the right section of the third guiding channel 536. Likewise, when the operating lever 43 is released at this time, the upper end of the retaining rod 54 can extend into the third guiding channel 536 due to the biasing forces of the biasing spring 45 and the torsion spring 56, as shown in FIG. 12. The valve member 44 (see FIG. 8) is thus retained in the open position with another desired fluid flow, i.e., the second stage fluid flow, through the spout portion 42.

The staggered tips and corners formed on the guiding blocks 531, 532, 533 also function to guide leftward movement of the upper end of the retaining rod 54 toward the left guiding groove 539 when the operating lever 43 is depressed while the upper end of the retaining rod 54 is in one of the second and third guiding channels 535, 536.

Accordingly, the water spraying gun of the present invention is capable of regulating fluid flow through the spout portion by simply depressing the operating lever using only one hand of the user. Of course, the number of the guiding channels can be increased to increase the number of available fluid flow stages.

With this invention thus explained, it is apparent that numerous modifications and variations can be made without departing from the scope and spirit of this invention. It is therefore intended that this invention be limited only as indicated in the appended claims.

I claim:

1. A water spraying gun, comprising:
   a gun housing which includes a hollow handle portion that confines an elongate first fluid passage with a front end and a first longitudinal axis, and a hollow spout portion that is formed on said handle portion adjacent to said front end of said first fluid passage and that confines a second fluid passage with a second longitudinal axis generally perpendicular to said first longitudinal axis, said gun housing being formed with a fluid opening to communicate said first and second fluid passages, said handle portion being formed with an inward flange at juncture of said handle portion and said spout portion to define said fluid opening;
   a valve member movably disposed in said second fluid passage of said spout portion and provided with a valve ring, said valve member being movable between a closed position, in which said valve ring is seated on said flange to block fluid flow from said fluid opening to said second fluid passage, and an open position, in which said valve ring is spaced from said flange to permit fluid flow from said fluid opening to said second fluid passage;
   an operating lever disposed on top of said handle portion, and having a front end portion coupled to said valve member, a rear end portion, and an intermediate portion between said front and rear end portions, said intermediate portion being mounted pivotally to said handle portion, said operating lever being operable at said rear end portion to move said valve member between said closed position and said open position;
   a biasing spring disposed in said spout portion of said gun housing, said biasing spring normally biasing said valve member to said closed position; and
   a positioning unit which includes:
     a hollow seat secured on top of said handle portion and disposed between said handle portion and said rear end portion of said operating lever, said hollow seat being formed with a vertical slide channel which is generally transverse to said first longitudinal axis, and having a top side formed with a top opening for access into said slide channel;
     a retaining rod having a lower end pivoted to said seat below said slide channel, and an upper end;

a downwardly opened elongated groove formed in said rear end portion of said operating lever, said elongated groove extending in a direction parallel to said first longitudinal axis; and a slide member having an upper end formed with a protrusion that engages slidably said elongated groove, said slide member extending slidably into said slide channel in said seat via said top opening and being moved in said slide channel when said operating lever is depressed, said slide member having a vertical guiding face which is formed with a V-shaped first guiding channel, a V-shaped second guiding channel above said first guiding channel, and a V-shaped third guiding channel above said second guiding channel, each of said first, second and third guiding channels having a left section which inclines upwardly and leftward and which has an upper end, and a right section which inclines upwardly and rightwardly and which has an upper end, said guiding face being further formed with a vertical right guiding groove on a right side of said first, second and third guiding channels and communicated with said upper ends of said right sections of said first, second and third guiding channels, and a vertical left guiding groove on a left side of said first, second and third guiding channels and communicated with said upper ends of said left sections of said first, second and third guiding channels, said upper end of said retaining rod extending toward said vertical guiding face and being normally retained in said first guiding channel when said valve member is in the closed position, operation of said operating lever while said upper end of said retaining rod is in said first guiding channel causing said upper end of said retaining rod to move into said right guiding groove so as to extend into a selected one of said second and third guiding channels to permit retention of said valve member at the open position with a predetermined fluid flow through said second fluid opening, operation of said operating lever while said upper end of said retaining rod is in one of said second and third guiding channels causing said upper end of said retaining rod to move back to said first guiding channel via said left guiding groove.

2. The water spraying gun according to claim 1, wherein said guiding face is formed with a check member in said left section of said first guiding channel to prevent movement of said upper end of said retaining rod into said left guiding groove when said upper end of said retaining rod is in said first guiding channel while said operating lever is depressed, said check member permitting movement of said upper end of said retaining rod from said left guiding groove to said first guiding channel.

3. The water spraying gun according to claim 1, wherein said guiding face is formed with a check member in said right guiding groove for permitting only upward movement of said upper end of said retaining rod in said right guiding groove.

4. The water spraying gun according to claim 1, wherein said guiding face is formed with a check member in said right section of said second guiding channel for preventing movement of said upper end of said retaining rod into said right guiding groove when said upper end of said retaining rod is extended into said second guiding channel.

5. The water spraying gun according to claim 1, wherein said guiding face is formed with a check member in said right section of said third guiding channel for preventing movement of said upper end of said retaining rod into said right guiding groove when said upper end of said retaining rod is extended into said third guiding channel.

6. The water spraying gun according to claim 1, further comprising biasing means provided on said lower end of said retaining rod for biasing said upper end of said retaining rod away from said right guiding groove.

7. The water spraying gun according to claim 1, wherein said second guiding channel is defined by a V-shaped upper wall with a tip and a V-shaped lower wall with a corner, said tip being staggered with said corner and being located rightwardly relative to said corner.

8. The water spraying gun according to claim 1, wherein said third guiding channel is defined by a V-shaped upper wall with a tip and a V-shaped lower wall with a corner, said tip being staggered with said corner and being located rightward relative to said corner.

9. The water spraying gun according to claim 1, wherein said guiding face of said slide member is formed with a V-shaped first guiding block having a lower surface formed with a tip, and an upper surface formed with a corner, a V-shaped second guiding block having a lower surface formed with a tip and an upper surface formed with a corner, and a triangular third guiding block having a lower surface formed with a tip, said first and second guiding blocks cooperatively defining said second guiding channel, said second and third guiding blocks cooperatively defining said third guiding channel, said tip of said second guiding block being staggered with said corner of said first guiding block and being located rightward relative to said corner of said first guiding block, said tip of said third guiding block being staggered with said corner of said second guiding block and being located rightward relative to said corner of said second guiding block.

10. A water spraying gun, comprising:

a gun housing which includes a hollow handle portion that confines an elongate first fluid passage with a front end and a first longitudinal axis, and a hollow spout portion that is formed on said handle portion adjacent to said front end of said first fluid passage and that confines a second fluid passage with a second longitudinal axis generally perpendicular to said first longitudinal axis, said gun housing being formed with a fluid opening to communicate said first and second fluid passages, said handle portion being formed with an inward flange at juncture of said handle portion and said spout portion to define said fluid opening;

a valve member movably disposed in said second fluid passage of said spout portion and provided with a valve ring, said valve member being movable between a closed position, in which said valve ring is seated on said flange to block fluid flow from said fluid opening to said second fluid passage, and an open position, in which said valve ring is spaced from said flange to permit fluid flow from said fluid opening to said second fluid passage;

an operating lever disposed on top of said handle portion, and having a front end portion coupled to said valve member, a rear end portion, and an intermediate portion between said front and rear end portions, said intermediate portion being mounted pivotally to said handle portion, said operating lever being operable at said rear end portion to move said valve member between said closed position and said open position;

a biasing spring disposed in said spout portion of said gun housing, said biasing spring normally biasing said valve member to said closed position; and a positioning unit which includes:
- a hollow seat secured on top of said handle portion and disposed between said handle portion and said rear end portion of said operating lever, said hollow seat being formed with a vertical slide channel which is generally transverse to said first longitudinal axis, and having a top side formed with a top opening for access into said slide channel;
- a retaining rod having a lower end pivoted to said seat below said slide channel, and an upper end;
- a downwardly opened elongated groove formed in said rear end portion of said operating lever, and extending in a direction parallel to said first longitudinal axis; and
- a slide member having an upper end formed with a protrusion that engages slidably said elongated groove, said slide member extending slidably into said slide channel in said seat via said top opening and being moved in said slide channel when said operating lever is depressed, said slide member having a vertical guiding face which is formed with a vertical guiding groove and at least three inclined guiding channels that incline downwardly from one side of said vertical guiding groove, said upper end of said retaining rod extending toward said vertical guiding face and being normally retained in a lowermost one of said inclined guiding channels when said valve member is in the closed position, said upper end of said retaining rod moving into said vertical guiding groove when said operating lever is depressed, and extending into one of the other two of said inclined guiding channels when said operating lever is released, thereby permitting retention of said valve member at the open position with a predetermined fluid flow through said second fluid passage.

11. The water spraying gun according to claim 10, further comprising biasing means provided on said lower end of said retaining rod for biasing said upper end of said retaining rod away from said vertical guiding groove.

* * * * *